(12) United States Patent
Williams et al.

(10) Patent No.: US 10,541,746 B2
(45) Date of Patent: Jan. 21, 2020

(54) SYSTEMS AND METHODS FOR LINE ATTENUATION TESTING

(71) Applicant: CABLE TELEVISION LABORATORIES, INC, Louisville, CO (US)

(72) Inventors: Thomas H. Williams, Longmont, CO (US); Ryan Richard Vail, Loveland, CO (US)

(73) Assignee: Cable Television Laboratories, Inc, Louisville, CO (US)

(*) Notice: Subject to any disclaimer, the term of this patent is extended or adjusted under 35 U.S.C. 154(b) by 177 days.

(21) Appl. No.: 15/634,251

(22) Filed: Jun. 27, 2017

(65) Prior Publication Data

US 2017/0373749 A1 Dec. 28, 2017
US 2019/0109637 A9 Apr. 11, 2019

Related U.S. Application Data

(63) Continuation-in-part of application No. 15/481,135, filed on Apr. 6, 2017.

(60) Provisional application No. 62/354,945, filed on Jun. 27, 2016, provisional application No. 62/318,871, filed on Apr. 6, 2016, provisional application No. 62/327,199, filed on Apr. 25, 2016.

(51) Int. Cl.
| | | |
|---|---|---|
| *H04B 10/07* | (2013.01) | |
| *H04B 10/077* | (2013.01) | |
| *H04B 10/071* | (2013.01) | |
| *H04B 10/25* | (2013.01) | |
| *H04B 3/48* | (2015.01) | |

(52) U.S. Cl.
CPC ......... *H04B 10/0775* (2013.01); *H04B 3/48* (2013.01); *H04B 10/071* (2013.01); *H04B 10/2503* (2013.01)

(58) Field of Classification Search
USPC .................................................. 324/637–647
See application file for complete search history.

(56) References Cited

U.S. PATENT DOCUMENTS

| | | | |
|---|---|---|---|
| 5,504,832 A * | 4/1996 | Taguchi | G10L 19/0212 704/201 |
| 5,652,522 A * | 7/1997 | Kates | G01N 22/00 324/642 |
| 6,509,740 B1 | 1/2003 | Needle et al. | |

(Continued)

*Primary Examiner* — Jeff W Natalini
(74) *Attorney, Agent, or Firm* — Armstrong Teasdale LLP

(57) ABSTRACT

A system for testing line attenuation defects includes a data transmission line configured to transmit a forward signal in a first direction, at least one reflection point at a first location along the data transmission line, a test probe configured to (i) electrically contact a center conductor at a second location along the data transmission line, (ii) introduce a broadband data signal onto the data transmission line, and (iii) measure, at the second location, a return signal from the reflection point, and a spectrum capturing device in operable contact with the test probe. The spectrum capturing device is configured to (i) collect and arrange frequency data measured by the test probe for the test signal, the return signal, and a standing wave created by the sum of the broadband data signal and the return signal, (ii) determine the voltage VSWR of the standing wave, and (iii) calculate a line loss from the VSWR.

6 Claims, 12 Drawing Sheets

(56) References Cited

U.S. PATENT DOCUMENTS

| | | | |
|---|---|---|---|
| 7,212,008 B1 * | 5/2007 | Barsumian | G01R 31/11 324/533 |
| 7,583,074 B1 * | 9/2009 | Lynch | G01S 13/89 324/120 |
| 8,917,097 B2 | 12/2014 | Landes et al. | |
| 2005/0089334 A1 | 4/2005 | Regev et al. | |
| 2005/0190104 A1 | 9/2005 | Coleman et al. | |
| 2007/0121267 A1 | 5/2007 | Kotani et al. | |
| 2007/0152601 A1 * | 7/2007 | Nerone | H02M 1/15 315/209 R |
| 2010/0244859 A1 * | 9/2010 | Cormier, Jr. | G06F 3/044 324/678 |
| 2010/0318026 A1 * | 12/2010 | Grunwald | A61B 5/04017 604/95.05 |
| 2017/0141845 A1 | 5/2017 | Totten et al. | |

* cited by examiner

SYSTEMS AND METHODS FOR LINE ATTENUATION TESTING

CROSS REFERENCE TO RELATED APPLICATIONS

This application is a continuation-in-part of U.S. patent application Ser. No. 15/481,135, filed Apr. 6, 2017, which claims the benefit of and priority to U.S. Provisional Patent Application Ser. No. 62/318,871, filed Apr. 6, 2016, and also to U.S. Provisional Patent Application Ser. No. 62/327,199, filed Apr. 25, 2016, the disclosures of all of which are herein incorporated by reference in their entirety. This application further claims the benefit of and priority to U.S. Provisional Patent Application Ser. No. 62/354,945, filed Jun. 27, 2016, the disclosure of which is also herein incorporated by reference in its entirety.

BACKGROUND

The field of the disclosure relates generally to data transmission systems, and more particularly, to attenuation testing on data transmission lines.

In conventional data transmission systems, two impedance mismatches can create an echo tunnel on a transmission line, such as a cable line. A receiver of a conventional system will then observe a resulting ripple in the frequency response of the transmission line, as well as an impulse in the time domain response, which is echoes are normally delayed relative to a main impulse. However, when only one reflection is present, a resulting frequency response will be flat at the receiver (i.e., not rippled), but have a relatively lower amplitude due to signal loss. It is therefore difficult, in conventional data transmission systems, to discover line defects, such as loose fittings and radial cracks, where an echo tunnel is not formed because only one impedance mismatch is encountered. This problem is rendered more difficult due to the fact that time domain reflectometer (TDR) test equipment cannot be used on in-service cable plant. Accordingly, there is a need to be able to locate line defects on an in-service data transmission line when only one impedance mismatch is observed.

Additionally, conventional cable operators experience a problem with aging cable lines that, over time, experience a variety of faults. A shield break in the cable line, for example, is a fault producing a discrete reflection from one point in the line. Other faults, such as water seeping into the cable, will increase signal attenuation through the cable, even if the seepage only sometimes produces reflections. One conventional solution utilizes adaptive equalizers to compensate for reflections that are not too significant, but this solution does not address situations where the reflections are severe. Moreover, flat signal attenuation experiences an additional noise problem due to low signal level pushing the desired signal into a noise floor.

Another conventional solution utilizes a network analyzer to measure a length of coaxial cable, but only when both ends of the measured length are in the same location. When the ends are not located together, a transmitter may be placed at one end of the measured length, and a receiver at the other end. A training signal is transmitted from end to end, and channel response phase information and magnitude are computed for the captured training signal. This solution is not implemented on an in-service line.

When an in-service cable line experiences transmission difficulties, the questionable cable line must be assessed for the line quality. That is, the line must be checked for faults due to problems such as water damage, stress fractures, corrosion, bad connectors, animal chews, or other mechanical damage. The line may have excessive attenuation, reflections, or both. The line must also be checked to determine if there has been an attempt to cut into the line for signal sharing, such as from an illegal tap. Conventional testing schemes measure the broadband signals at both ends of the questionable line, and subtract the difference for attenuation versus frequency to estimate the source of the fault. This conventional solution also inconveniently requires active measurement equipment at both ends of the line.

BRIEF SUMMARY

In an embodiment, a system for testing line attenuation defects includes a data transmission line configured to transmit a forward signal in a first direction, the data transmission line including at least one reflection point at a first location along the data transmission line, a test probe configured to (i) electrically contact center conductor at a second location along the data transmission line different from the first location, (ii) introduce a broadband data signal onto the data transmission line in the first direction, and (iii) measure, at the second location, a return signal from the reflection point, the return signal being a reflection of the broadband data signal traveling in a second direction opposite the first direction, and a spectrum capturing device in operable contact with the test probe, and wherein the spectrum capturing device is configured to (i) collect and arrange frequency data measured by the test probe for the broadband data signal, the return signal, and a standing wave created by the sum of the broadband data signal and the return signal, (ii) determine the voltage standing wave ratio (VSWR) of the standing wave, and (iii) calculate a line loss from the VSWR.

In an embodiment, a method of detecting line attenuation on a data transmission line includes steps of electrically contacting a tap of the data transmission line at a first location on the data transmission line, transmitting a broadband data signal from the tap in a first direction along the data transmission line, measuring, at the first location, a return signal from a reflection point at a second location on the data transmission line different from the first location, the return signal being a reflection of the transmitted broadband data signal traveling in a second direction opposite the first direction, collecting, at the first location, spectral data of the broadband data signal, the return signal, and a standing wave created by the sum of the broadband data signal and the return signal, determining the voltage standing wave ratio (VSWR) of the standing wave, and calculating a line attenuation from the determined VSWR.

In an embodiment, a system for measuring standing waves includes a transmission line for transporting a noise-like forward digital signal in a first direction and for transporting a reflected digital signal in a second direction opposite to the first direction, a voltage probe in contact with a center conductor of the transmission line, and a capturing device in operable contact with the voltage probe, the capturing device being configured to capture a magnitude spectrum containing a standing wave including the forward digital signal and the reflected digital signal.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
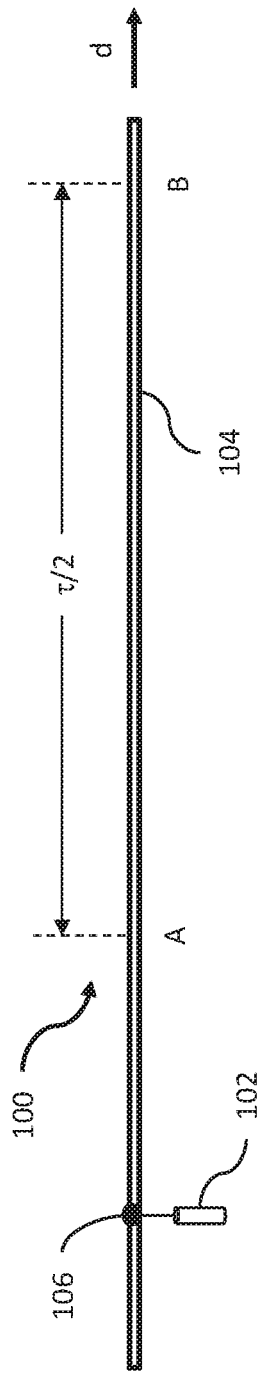
FIG. 1 is a schematic illustration depicting an exemplary data transmission system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

In an exemplary embodiment, a high impedance probe (connected to a spectrum analyzer or data acquisition device, such as a software defined radio (SDR), or analog-to-digital converter (ADC) whose captured data is Fourier transformed) is brought into contact with an operational transmission line to observe a standing wave with a single reflection. The standing wave results from linear addition and subtraction of signals at different frequencies, caused by two signals traveling in opposite directions along the transmission line. The high impedance probe thus samples the standing wave without affecting the wave. In one example, the signals are cable signals, and are assumed to exhibit a relatively flat energy-versus-frequency ratio. With a further assumption that imaginary values for such a cable signal are all zero, and real values are all magnitudes measured by the probe, the signal can then be transformed (e.g. by an inverse Fourier transform) into the time domain. That is, complex data points are not captured, just magnitude values. This time domain data, which may be obtained from an inverse Fourier transform of the spectral magnitude data, and obtained utilizing the high-impedance probe, may then be advantageously utilized to locate single reflections on an in-service transmission line/cable plant from the time delay, from which distance can be calculated knowing the velocity of propagation inside the cable.

In another embodiment, frequency response is determined by measuring, at one end of a cable line, the Voltage Standing Wave Ratio (VSWR) from an intentionally placed short (or open circuit) at the other end. This VSWR determination can be performed from a single active measurement point, which measures the sum of a forward signal and the return signal reflected from the short. In some embodiments, a return loss bridge is utilized to separate the return signal from the transmitted signal. An increase in line loss may be determined by a decrease in the expected ripple. A Fourier transform of the returned frequency data will then indicate the round-trip distance to the intentional open circuit, allowing computation of expected loss. Test results from this measurement may be provided to a measuring technician as a pass/fail answer indicator.

FIG. 1 is a schematic illustration depicting an exemplary data transmission system 100, according to an embodiment. System 100 includes a test probe 102 for measuring a data transmission line 104 at a contact location 106. In an exemplary embodiment, test probe 102 is a high impedance probe to limit mismatch, and data transmission line 104 represents an in-service cable plant transporting live data signals. In one example, test probe 102 is configured to electrically contact a seizure screw of a tap (not shown) in the data transmission line 104 while data transmission line is in-service, through a KS port on a tap (see FIG. 5, not shown in FIG. 1) and provide a 75 ohm output signal attenuated by some fixed value, such as 20 or 30 decibels (dB).

In a preliminary exemplary operation, test probe 102 contacts data transmission line 104, which exhibits a single reflection from a nearby first reflection point A, and from a distant second reflection point B which represent respective impedance matches. In some embodiments, data transmission line 104 is a coaxial cable, and test probe 102 physically contacts a center conductor (not shown) of the coaxial cable. In alternative embodiments, where data transmission line 104 is not a coaxial cable, test probe 102 may operate according to waveguide or parallel conductor principles. In this example, it is presumed that a direction of travel d for a downstream signal is known, and thus it is understood that the single reflection emanates from the left (as illustrated) and travels in downstream direction d.

In an alternative operation of system 100, reflections occur at both first reflection point A and second reflection point B, forming an echo tunnel therebetween, where a test point, such as an end point in a home (not illustrated) terminates data transmission line 104 outside the echo tunnel. In this example, an echo occurring within the echo tunnel would die out after multiple transits between the two points (A and B) impedance matching. A time constant $\tau$ characterizes the frequency response of system 100, and represents the elapsed system response time for a full transit from point A to point B and back again, and therefore the response time from only one point to the other has a value of $\tau/2$.

Figure 2:
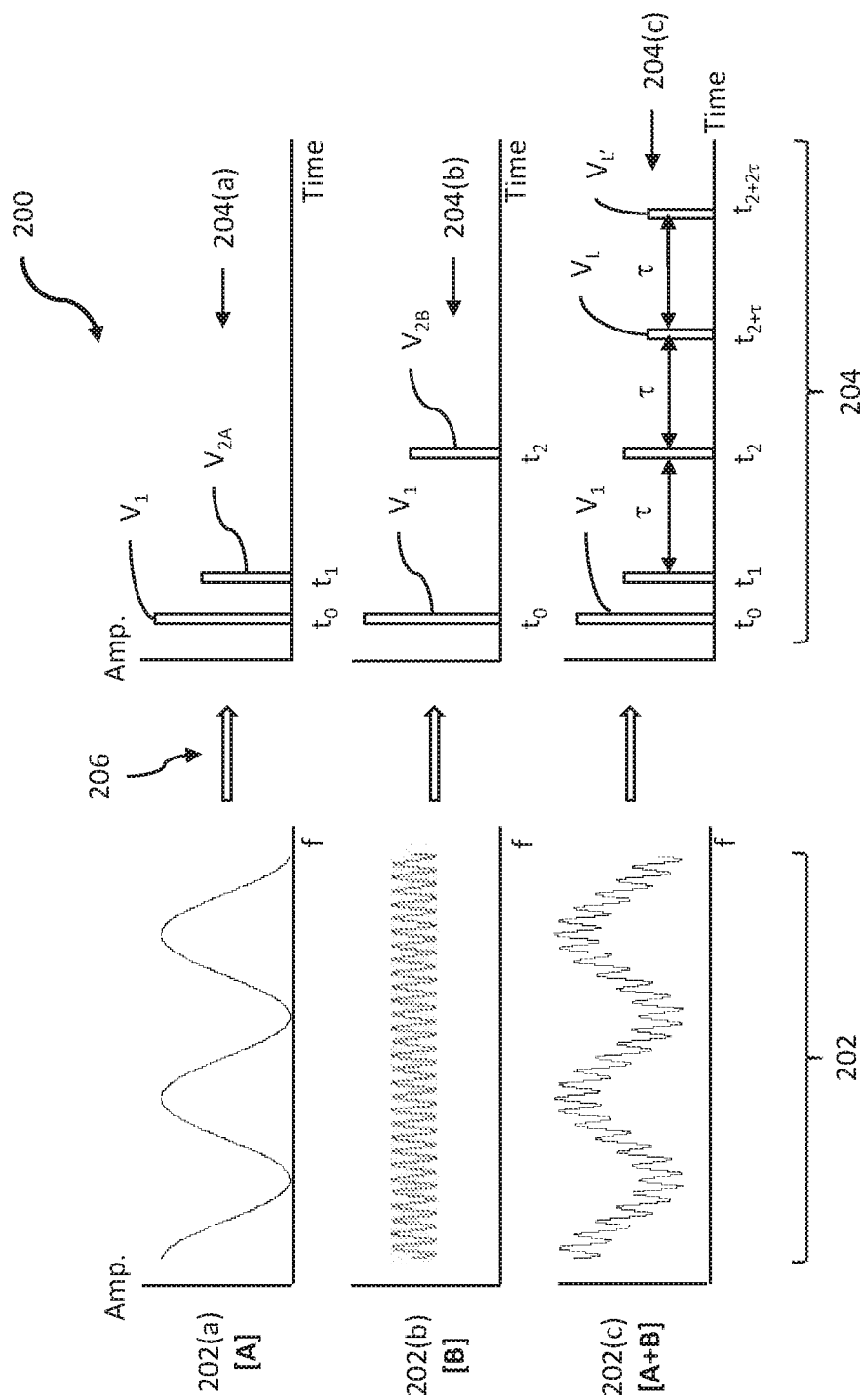
FIG. 2 is a graphical illustration of the frequency response and the time domain response of the data transmission system depicted in FIG. 1.

FIG. 2 is a graphical illustration 200 of exemplary frequency responses 202 and corresponding exemplary time domain responses 204 of data transmission system 100, FIG. 1. Time domain responses 204 may result, for example, from application of an inverse fast Fourier transform (IFFT) 206 on respective ones of the frequency responses 202. In the example depicted in FIG. 2, frequency response 202(a) and associated time domain response 204(a) are both illustrated in the case of a single reflection from first reflection point A (e.g., a short reflection); responses 202(b) and 204(b) are both illustrated in the case of a single reflection from second reflection point B (e.g., a long reflection); and responses 202(c) and 204(c) are both illustrated in the case of an echo tunnel formed between points A and B, where test probe 102 is upstream of the echo tunnel formed between points A and B, as depicted in FIG. 1. Responses 202 and 204 are depicted for illustrative purposes, and are not intended to reflect an exact scale.

In the exemplary embodiment depicted in illustration 200, the severity of each measured reflection can be determined according to the formula $20*\log(V1/V2)$, where V1 is a direct current (DC) voltage term representing the main impulse forward signal traveling to the right, and V2 represents the energy of the reflected signal traveling to the left. In some embodiments, the impedance mismatch severity is more accurately measured by factoring in cable attenuation, which increases both with increasing distance and frequency. In this example, decreasing energy is represented by measurements $V_L$, $V_{L'}$ at times $t_{2+\tau}$, $t_{2+}2\tau$, respectively.

Figure 3:
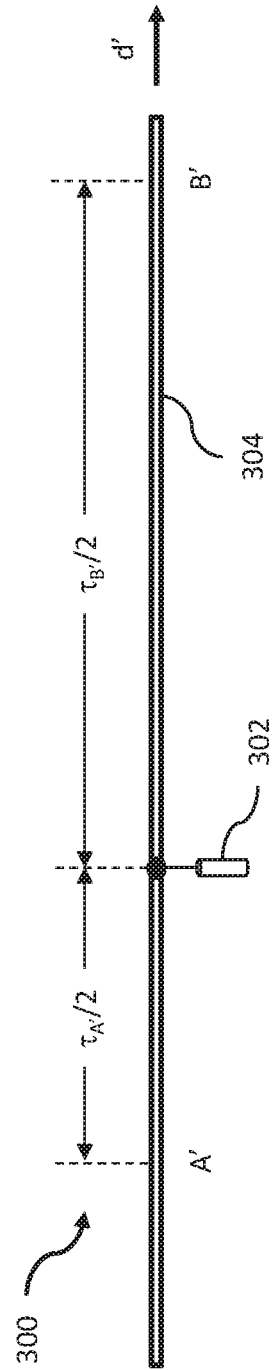
FIG. 3 is a schematic illustration depicting an exemplary data transmission system, according to an alternative embodiment.

FIG. 3 is a schematic illustration depicting an exemplary data transmission system 300, according to an alternative embodiment. System 300 includes a test probe 302 for measuring an in-service data transmission line 304 having a direction of downstream signal travel d', and an echo tunnel formed between a first reflection point A' and a second reflection point B'. System 300 is similar to system 100 except that test probe 302 contacts data transmission line 304 inside of the portion of the data transmission line containing the echo tunnel.

In exemplary operation, because test probe 302 is downstream first reflection point A', but upstream second reflection point B', the reflection from second reflection point B' (e.g., having a time constant $\tau_B/2$) is observable test probe 302, whereas the direct reflection from first reflection point A' is not. However, the indirect reflection from first reflection point A' can be observed by test probe 302 after the indirect reflection echoes from second reflection point B' and then reverses direction from downstream to upstream. As described above, this echo dies out after multiple transits between the two impedance mismatches (e.g., represented by points A' and B'), as explained further below with respect to FIG. 4.

Figure 4:
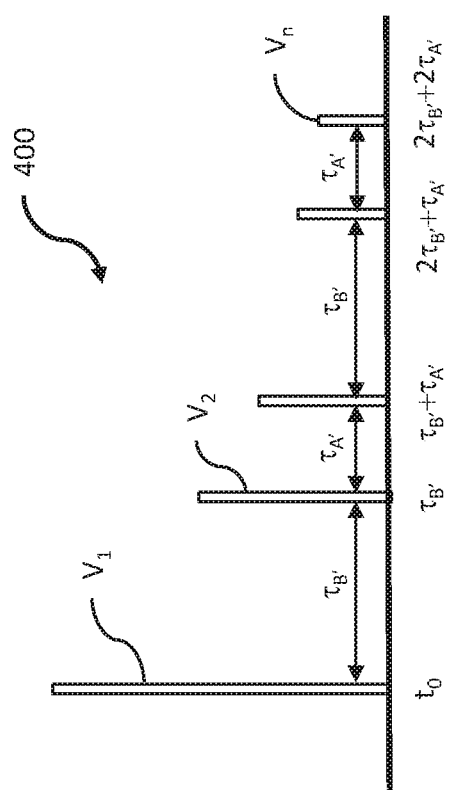
FIG. 4 is a graphical illustration of the time domain response of the data transmission system depicted in FIG. 3.

FIG. 4 is a graphical illustration of a time domain response 400 of data transmission system 300, FIG. 3. In the exemplary embodiment, time domain response 400 includes a plurality of energy recursions $V_{1-n}$ that diminish over time, where the energy determinations are made at combined multiples of $\tau_{B'}$ and $\tau_{A'}$ (e.g., $\tau_{B'}$, $\tau_{B'}+\tau_{A'}$, $2\tau_{B'}+\tau_{A'}$, $2\tau_{B'}+2\tau_{A'}$). In this example, multiple recursions thus indicate the presence of an echo tunnel, whereas a single substantially measurable recursion in time domain response 400 would indicate a single reflection only. Accordingly, location of a test probe outside of an echo tunnel renders the observation of the echo tunnel easier. Generally, the output of a downstream RF amplifier serves as a sufficient location for a bidirectional probe because all relevant reflections will be downstream. That is, downstream amplifiers amplify signals traveling in the downstream direction.

Figure 5:
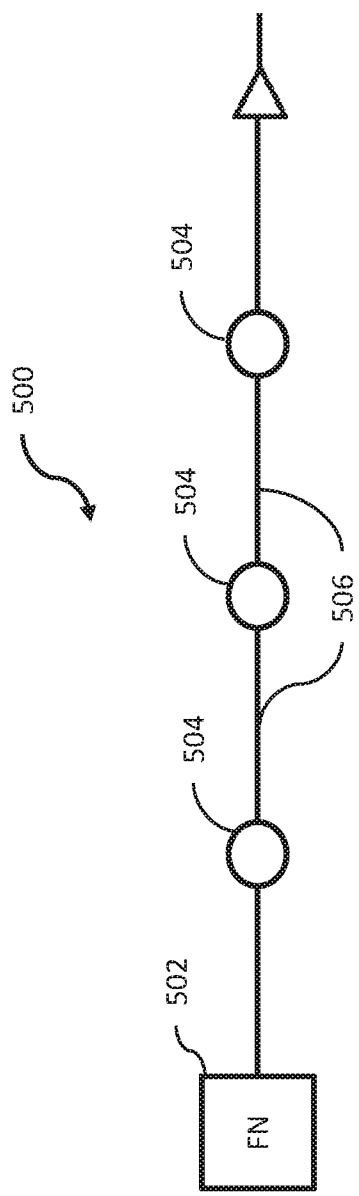
FIG. 5 is a schematic illustration depicting an alternative data transmission system.

FIG. 5 is a schematic illustration depicting an alternative data transmission system 500. System 500 includes a fiber node 502 and a plurality of cascading taps 504 located along a data transmission line 506. System 500 may be, for example, similar to either or both of system 100, FIG. 1, and system 300, FIG. 3. In an exemplary embodiment, data transmission line 506 is a hard line coaxial cable. In some embodiments, fiber node 502 functions as a test point utilizing a directional coupler. In exemplary operation, a bi-directional signal (not shown) may be probed (e.g., by a test probe, as described above) at an input or output of one or more of taps 504.

Figure 6:
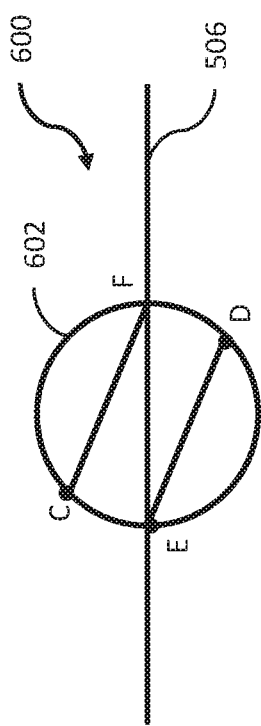
FIG. 6 is a schematic illustration of an alternative tap that can be implemented on the data transmission line depicted in FIG. 5.

FIG. 6 is a schematic illustration of an alternative tap 600 that can be implemented on data transmission line 506, FIG. 5. Tap 600 is similar to tap 504, FIG. 5, except that tap 600 utilizes a tap plate 602 that functions as a bi-directional directional coupler. Tap plate 602 includes an upstream test point C, a downstream test point D, and a bidirectional test points E and F. Tap 600 thus functions as an alternative system to distinguish downstream signals from upstream signals by functionally implementing two directional couplers in series; with one tap port (D) sampling downstream signals, and the other tap port (C) sampling upstream signals. In other words, an unimpaired signal can be measured at a noted test point (e.g., fiber node 502, FIG. 5) or point D, an upstream signal can be measured at point C, and bidirectional signals can be measured at point E or F.

In some embodiments, tap plate 602 temporarily replaces a regular tap plate (e.g., tap 504, FIG. 5), which typically has customers connected, without disrupting signals transmitted along data transmission line 506. In one example, tap plate 602 has a value of 12 dB. In an exemplary embodiment of tap 600, a distance to a single reflection (not illustrated in FIG. 6) may be determined utilizing a wideband signal capture at points D and C (e.g., by a two-channel digital oscilloscope), and then determining a complex cross-correlation to provide the corresponding time delay of the reflection.

Figure 7:
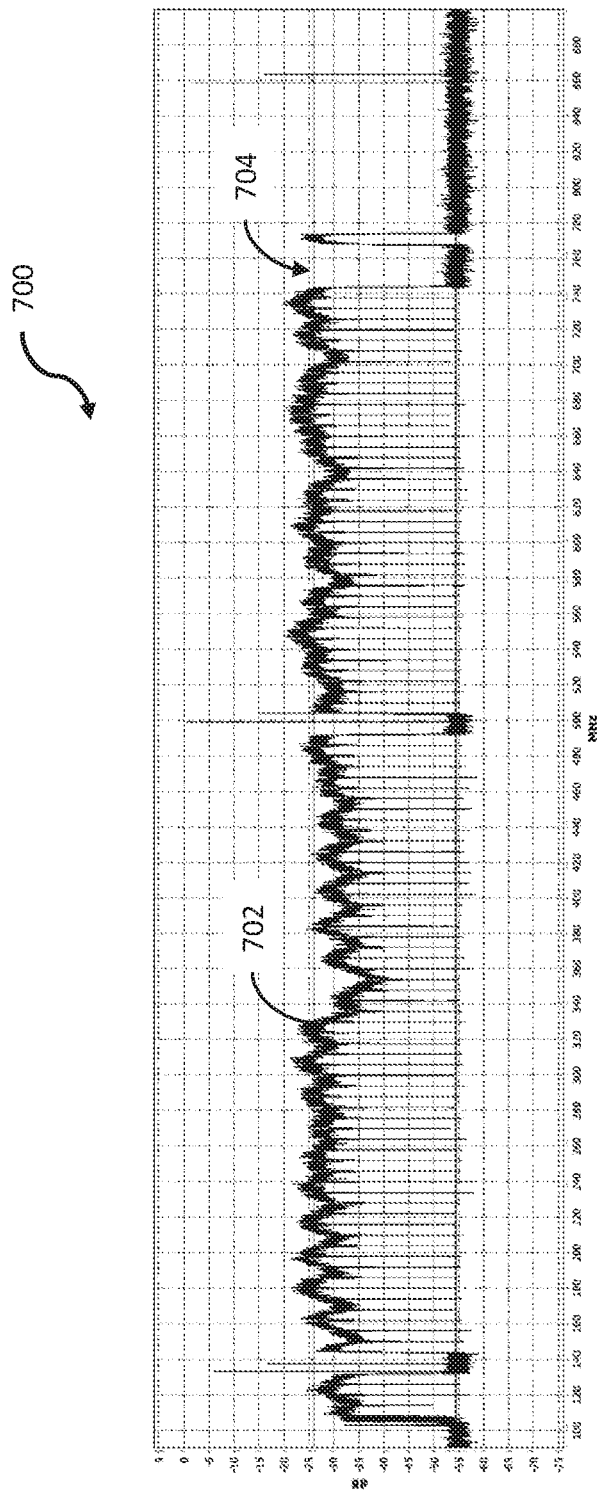
FIG. 7 is a graphical illustration of a magnitude plot of captured spectral data.

FIG. 7 is a graphical illustration of a magnitude plot 700 (in dB) over frequency (in megahertz (MHz)) of captured spectral data 702 of a downstream digital signal, as described above. Magnitude plot 700 may, for example, include at least one vacant band 704. In an exemplary embodiment, plot 700 is utilized to calculate an impulse response from the magnitude-only frequency response. Ripples in spectral data 702 of plot 700 indicate the existence of an echo tunnel (e.g., as if the data were captured in a home environment), however, no phase data is available from the magnitude only frequency response information. The magnitude spectral data may be captured, for example, by a software-defined radio (SDR) or by a conventional spectrum analyzer. In order to perform an IFFT to convert spectral data into time data, a (false) phase value of zero may be used to allow the transform to be successfully performed. It may be noted that, utilization of this false phase value implicitly assumes that some other linear distortions, such as group delay, will not be visible. However, the ripples in the frequency domain indicate the distances to the impedance mismatches, with significant accuracy, for a wide capture of spectral data 702. In some embodiments, an average of many spectral traces is transformed so that the resulting time response will contain less random noise.

In an exemplary embodiment, the undistorted digital signal may be captured at the fiber node (e.g. fiber node 502, FIG. 5), which may function as a downstream launch point. Alternatively, the digital signal may be captured from a tap port (e.g., tap 504, FIG. 5), including a tap where a KS port seizure screw is probed. In this example, a seizure screw may be configured to observe the combined signals in both the upstream and downstream directions, whereas a conventional tap port will typically only observe downstream signals. In some embodiments, a high impedance probe (test probe 102, FIG. 1) electrically contacts the seizure screw on the tap, and the ripple effect in the frequency response can then be measured and plotted. In such circumstances, the frequency response may be measured from the tap input (or output) to the probe output, with a single back-echo creating the standing wave. As described above, ripples observed in a home indicate the presence of an echo tunnel; a single reflection typically will not be observable in a home terminal.

In at least one embodiment, the standing wave may be detected by first highly-averaging the spectral measurement of the unimpaired spectrum signal, and then using the unimpaired spectrum to correct for the highly-averaged received bidirectional signal through frequency domain division. It should be noted here that frequency domain division is not typically complex, that is, real-only, since phase is not known. In some embodiments, subtracting dB values will functionally achieve substantially the same calibration result. These calibration/normalization processes serve to remove the teeth (harmonics) on the comb that are depicted in FIG. 8.

In an additional or alternative embodiment, a length of an echo tunnel, caused by impairments on a transmission line, can be determined by performing an inverse Fourier transform, or an IFFT, on the magnitude-only frequency response of plot 700. In this embodiment, the phase of the response is presumed (falsely) to be zero, and the transform may be performed on the frequency response without having to provide any frequency domain imaginary data. In other words, a time domain response can be determined from the IFFT even when phase data is not available.

In some embodiments, a CPE Spectrum Capture (sometimes referred to as Full Band Capture (FBC) is utilized by cable modems and set-top boxes to provide magnitude-only spectral data about RF path conditions in a remote location, such as a home. In some such instances, the downstream channels being monitored are digital channels using, for example, 64-QAM or 256-QAM. In other instances, the monitored signals are analog signals, or noise and ingress.

Figure 8:
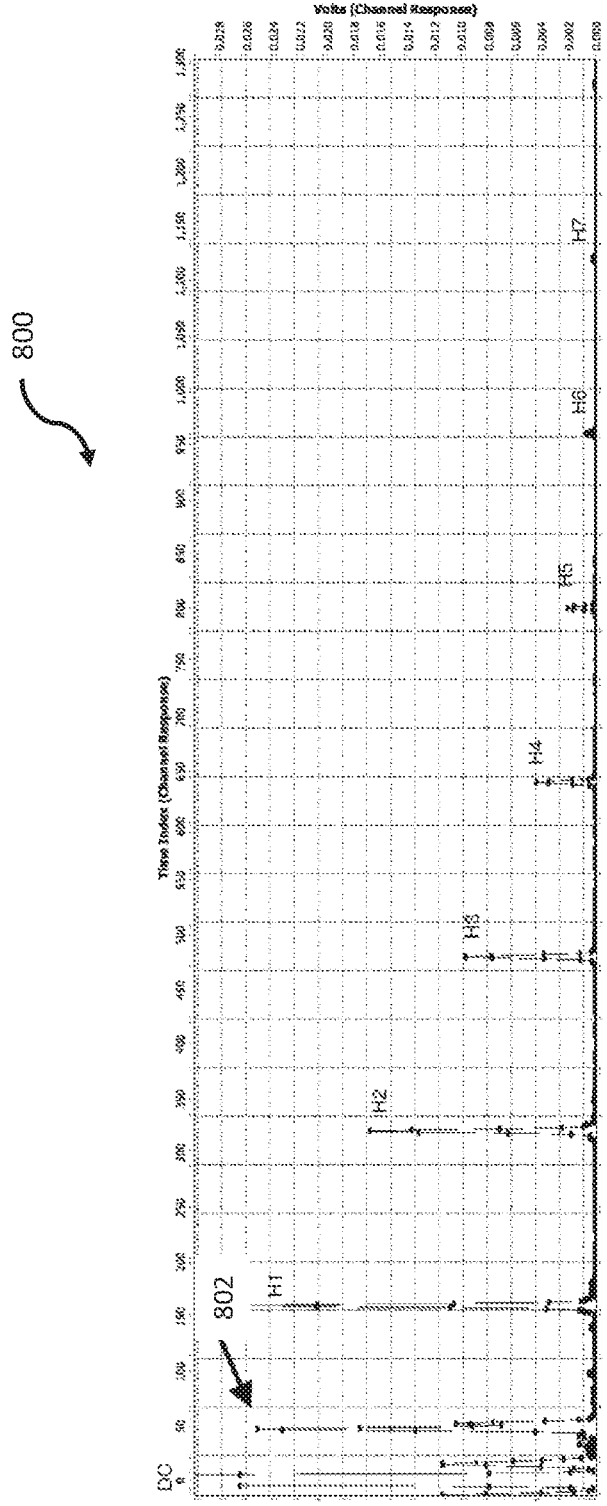
FIG. 8 is a graphical illustration of a time domain response of the magnitude plot depicted in FIG. 7.

FIG. 8 is a graphical illustration of a time domain response 800 of magnitude plot 700, FIG. 7. Time domain response 800 includes an impulse 802 and a plurality of peaks H1-H7. In the exemplary embodiment, time domain response 800 is created by performing an IFFT on plot 700, FIG. 7, and impulse 802 is caused by the ripple effect (wave) in the captured spectral data 702 frequency response, peaks H1-H7 are caused by spectral notches between QAM carriers. Although blocks of QAM signals are utilized in the example response 800 illustrated in FIG. 8, the systems and methods described herein are fully applicable to the other types of signals described above, as well as to signal types of such as orthogonal frequency-division multiplexing (OFDM), or orthogonal frequency-division multiple access (OFDMA), as utilized by, for example, Data Over Cable Service Interface Specification (DOCSIS) version 3.1.

In an alternative operation utilizing the measured information of plot 700 and the transformed information of response 800, a process to determine an impulse response for blocks of QAM signals (or OFDM/OFDMA, etc.) may be determined according to the following steps:

1. A block of averaged (smoothed) contiguous digital signals are selected from plot 700. Where practical, greater numbers of digital frequency samples per block may be selected to provide higher accuracy of the determination. For example, in the example shown in FIG. 7, each 7.5 MHz band may have 256 spectral components. Multiple blocks may then be "pasted" together to form a wide-band spectral response.

2. A sample of data 702 is extracted from each block/band, from the lower band edge of the lowest QAM signal, to the upper band edge of the highest QAM signal, and the sample data is converted into linear values. These values may then serve to function as the I (in-phase, or imaginary) components, as described above.

3. Use 0's for all Q (quadrature, or real) components.

4. Optionally, zero-pad additional values to fill out a 2^n IFFT transform, such as a 4096-point IFFT or a 16,384-point IFFT.

5. Optionally, apply a window to the collected data.

6. Optionally, interpolate frequency regions representing non-QAM signals, such as an analog RF carrier or a vacant band (e.g., vacant band 704), with a straight line between the channel just above the vacant band to the channel just below the vacant band.

7. Perform an IFFT on the converted linear values, including the zero-padded values, if applicable, to transform the spectral frequency data into the time domain.

8. Optionally, discard insignificant information because the transformed data will be symmetrical due to the fact that separate quadrature values were not provided (zeroed out). Additionally, a DC term will be present, as well as comb "teeth" (every 166.67 nanoseconds (ns) in the embodiment illustrated in FIG. 8) due to the notches between the 6 MHz channels illustrated.

9. Remove, by subtraction, the comb teeth. Alternately if the dropouts between channels are interpolated over, the comb teeth will disappear. As illustrated in FIG. 7, a ripple in the frequency domain will appear on plot 700 if an echo is present. Through performance of the IFFT, the ripple will linearly transform into impulse 802 located among the comb teeth, as illustrated in FIG. 8. However, where the echo is an exact multiple of 166.67 ns (the teeth spacing in the time domain), the echo is not as easily observed directly. Nevertheless, as described above with respect to FIGS. 1-4, the delay between the main impulse and the echo is the round trip time $\tau$ caused by a standing wave, corrected for velocity of propagation/velocity of the cable. Since the shape of the teeth on the comb are known, they can be removed by subtraction, and the remaining echo observed. In some embodiments, the teeth may be automatically removed through implementation of an unimpaired reference, for example, taken at an amplifier directional test point, at the launch point of the fiber node, or another location not affected by the reflected signal.

Further optional steps the process described above include, without limitation, (i) adding a correction factor to the frequency response of plot 700, depending on the percent ripple effect, to compensate for increased cable loss versus frequency, and (ii) measuring a reference signal at a node (e.g., fiber node 502, FIG. 5) to obtain a "clean copy" of the signal, which may be subsequently utilized to correct a measured test signal elsewhere along the transmission line, which may have experienced signal degradation, or slope compensation.

In one alternative embodiment, a portion of spectrum 702 is selected where the standing wave is greatest, such as the lower frequency range of plot 700. Selection of this lower frequency range may result in a larger $V_2/V_1$ ratio, and coaxial loss at relatively higher frequencies may result in a standing wave being larger at the lower frequencies. In this alternative example, by selecting only a limited portion of the spectrum, a wider impulse on the impulse response can be obtained. In other instances, larger standing waves may occur at the relatively higher frequencies.

Whether frequency response (e.g. plot 700) of the measured digital signal is deemed to include missing data, such missing data may additionally be addressed by one or more of the following ways, individually or collectively: (a) interpolated bars may be inserted between channels in order to fill in the gaps caused by channel roll-off (e.g., at 6 MHz band edges) or over missing channels; (b) an IFFT may be performed where there are noise-like signals; (c) a subtraction may be calculated for data of harmonics (H1, H2, etc.) from the time domain response information (after IFFT); and (d) where an unimpaired signal not suffering ripple is used for calibration Such calibration may include linear division in the frequency domain, or subtraction of dB values, which has a substantially same effect. The results produced therefrom can be considered valid because of the applicability of linearity to the IFFT process.

In further alternatives to the embodiments described above, an SDR be utilized over an FBC chip, or high impedance probe (e.g., test probe 102, FIG. 1) may include an amplifier or slope compensation to offset potential attenuation. In some embodiments, a general-purpose hand-held field meter is utilized to capture the magnitude only spectrum of plot 700. In other embodiments, only the OFDM portion of a downstream signal is utilized in order to reduce levels of elevated pilots.

For QAM signals in particular, the embodiments described herein are capable of achieving particular advantageous value over conventional systems or methods, because the wide bandwidth of the multiple QAM signals makes for determining significantly more accurate time resolution then can be conventionally achieved. In practical terms, this greater accuracy in the determined time resolution, allows a cable operator/repairer to locate a defect on a cable line to such accuracy that the operator need only dig a small hole to reach the buried cable for repair, as opposed to having to dig a long trench, where only a general vicinity of a defect can be determined.

Further advantages over conventional systems, which may be achieved according to the present embodiments, result from the removal of the effect of the notches between carriers, by interpolating over the notches. In some examples, the effect of the notches may be reduced by equalizing the magnitude response therefrom. In some embodiments, the systems and methods described above, as well as the alternatives thereto, may be implemented through use of analog spectrum analyzers, such as an Agilent HP8593E, that utilize a general-purpose interface bus (GPIB) to extract the magnitude data.

It can be noted that there are several variations to one basic idea described herein, namely, that of using measured magnitude data as the real part for the IFFT process, while assuming the imaginary part is always 0. One such variation, for example, reverses the implementation of the real and imaginary parts, but without significantly departing from the scope of the embodiments. For example, the measured magnitude values may be utilized as the imaginary part (I), while utilizing 0 consistently for the real part (Q). Likewise, the magnitude could be use as magnitude, and any fixed (or linearly increasing or decreasing) number used for phase angle.

Systems and methods described herein are therefore of particular use for viewing and locating a single reflection on a cable plant. Earlier proactive network maintenance (PNM) efforts were utilized to mine the upstream equalization data contained within cable modems, as an early method to predict wide problems in coaxial transmissions. The assumption was made that if an echo tunnel was present, then ripple would occur within the frequency domain, the frequency of the ripple would be an indicator of the length of the tunnel.

This earlier method, while highly valuable, had some limitations. A first limitation required at least two impedance mismatches to determine the tunnel. A second limitation occurred as a result of the narrow bandwidth of an upstream 6.4 MHz wide channel, which meant that the length of the tunnel could only be roughly approximated. A third limitation occurred as a result of the fact that an operator/technician did not know where the echo tunnel was located; only the length of the tunnel could be approximately determined, but not where the tunnel ended or began. Nevertheless, despite the fact that, like with approximation, the approximation proved of significant value the location can be determined.

The embodiments described above and throughout therefore demonstrate the development of a novel and useful testing system and test method to probe a bi-directional cable line with a high impedance probe, and then measure a VSWR on transmitted digital channels to locate a single reflection along the transmission line. As described above, a single reflection from the downstream direction creates a ripple in the frequency response, as viewed by a probe connected to a spectrum analyzer.

The embodiments described herein should be employed only with suitable test signals. In this regard, the type of test signal can be important, since TDRs, for example, cannot be utilized to measure and/or finalize signal from an in-service cable plant.

Digital downstream QAM carriers, on the other hand, may be utilized as test signals under some conditions. Referring back to FIG. 7, magnitude plot 700 of a digital downstream is captured, for example, utilizing an FBC CM chip, but may also be captured utilizing an SDR, or a conventional analog spectrum analyzer. The averaged data of plot 700 is processed as magnitude values by performance of an inverse Fourier transform (IFFT), and phase values are everywhere made zero. The data so transformed may then be viewed as frequency response 800, FIG. 8.

In practical applications, no phase data is available from a magnitude plot, and thus the embodiments herein, which determine the impulse from the magnitude-only data, are themselves performing an elegant bit of mathematics. As described above, the 6 MHz channels produce harmonics in the time domain, noted H1, H2, H3 . . . . However, a key point to the novel embodiments presented herein stems from having the ripple caused by the standing wave (labeled "wave" for purposes of this discussion). The wide bandwidth of the standing wave thereby allows for a very high precision measurement, including that of the distance of the impedance mismatch (its location) from merely knowing the location of the test probe, with the direction of the impedance mismatch assumed to originate from the downstream receiver.

The embodiments described herein significantly improve the accuracy of determining the distance along an available data transmission line based initially only measured magnitude-only values of the frequency response. The embodiments herein further allow for the advantageous determination and location of both single reflections along the transmission line, and also for echo tunnels formed along transmission lines, in some cases by interaction between two separate single reflections, or separate reflection points at varying distances from a test probe.

Figure 9:
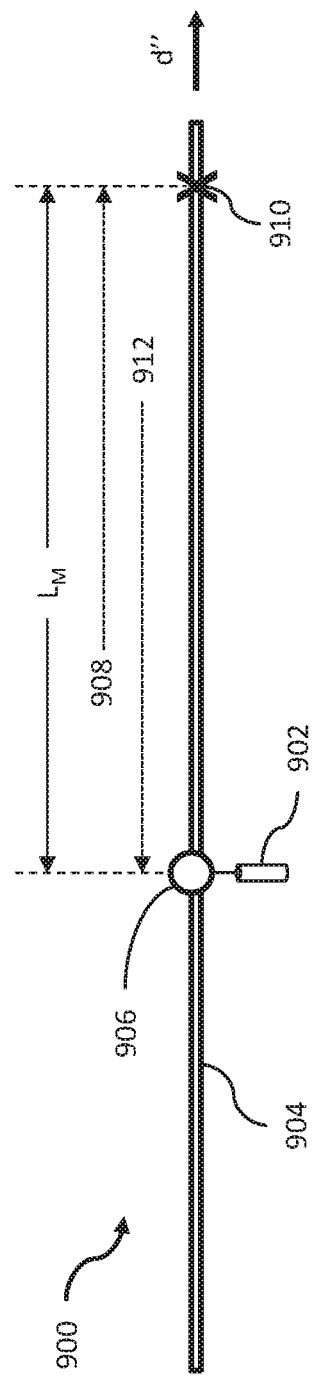
FIG. 9 is a schematic illustration depicting an exemplary data transmission system, according to an embodiment.

FIG. 9 is a schematic illustration depicting an exemplary data transmission system 900, according to an embodiment. System 900 includes a test probe 902 (e.g., a Trilithic I-Stop) for measuring a data transmission line 904 at a center conductor contact location 906. Contact location 906 may be, for example, a tap, an amplifier output, a power inserter, or a directional coupler, such that direct or indirect contact with the center conductor is achieved. Similar to system 100, depicted in FIG. 1, above, test probe 902 is a high impedance probe to limit mismatch, and data transmission line 904 represents a cable plant transporting data signals, and may be, for example, coaxial cable, waveguide, twisted pair, and/or twin lead transmission lines. Fiber optic cable is also contemplated, except would not involve electrical contact of a center conductor.

In operation, test probe 902 contacts contact location 906, from which a forward signal 908, such as a broadband data signal, is transmitted in downstream signal direction d" to a reflection point 910, which is located at a length $L_M$, or length-to-mismatch. A reflection signal 912 then returns from reflection point 910 to contact location 906 and probe 902, also similar to some of the operation of system 100, FIG. 1. In an exemplary embodiment, a short or open circuit is introduced into transmission line 904 at reflection point 910. Reflection point 910 can be created, for example, by a short, an open circuit, or a disconnection, which will create a reflection that adds out-of-phase return components (e.g., forward signal 908) to the in-phase components (e.g., reflection signal 912) at different frequencies. That is, forward data signal 908 and return signal 912 add in- and out-of-phase, depending on frequency, creating a standing wave (see FIG. 10, below) and standing wave ripples (see FIG. 11, below). Test probe 902 records the frequency spectrum and, in some embodiments, magnitude data from forward signal 908 and reflection signal 912 is subtracted to show the standing wave. Averaging is used to make a smooth plot. In the embodiment shown in FIG. 6, for example, forward signal 908 may be measured at point D, and reflection signal 912 can be measured at point C.

By creating and measuring standing waves according to these embodiments, system 900 is advantageously capable of determining if transmission line 904 is defective. In some embodiments, if a subsequent ripple of the measured standing wave is determined to be less than a predetermined value at one or more frequencies, it may then be further determined that line attenuation is excessive, and therefore, that a defect exists on transmission line 904. In an exemplary embodiment, system 900 utilizes one or more of the random noise or data carriers described above as the transmission/test signal, and further utilizes one or more of the relevant mathematical operations applied thereto.

The testing scheme of system 900, through utilization of a short to create a reflection point, provides minimum disruption to service over transmission line 904. For example, reflection point 910 may be created by an RF short-circuit device that does not short out AC power (e.g., a capacitor) and does not require physical disconnection of the entire cable. Likewise, the discontinuity may exist for only part of the downstream band. Accordingly, the testing scheme of system 900 overcomes drawbacks of conventional systems in that transmission line 904 can be tested for defects while remaining in-service, and while transporting live data signals. System 900 further advantageously utilizes a single test probe, and does not require a separate transmitter and receiver at different respective ends of transmission line 904. That is, system 900 utilizes the data carriers that are transporting data to subscribers.

Figure 10:
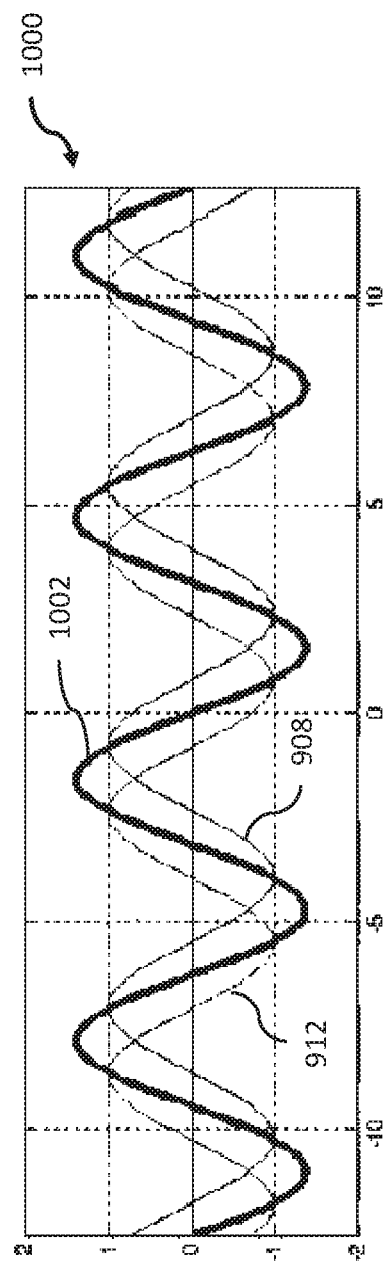
FIG. 10 is a graphical illustration of a plot of a standing wave produced with respect to the data transmission system depicted in FIG. 9.

FIG. 10 is a graphical illustration of a plot 1000 of a standing wave 1002 produced with respect to data transmission system 900, depicted in FIG. 9. In operation of system 900 as described above, forward signal 908 is transmitted in signal direction d", and reflection signal 912 is returned in the opposite direction. In the example illustrated in FIG. 10, forward signal 908 can be represented by y1=A sin(kx−wt), and reflection signal 912 may be represented by y2=A sin(kx+wt), where A and k are constants. For illustration purposes, A and k are both set to values of 1 for simplicity of explanation. Standing wave 1002 is then the sum of the individual wave signals created by forward signal 908 and reflection signal 912, respectively, and may be represented as y1+y2. That is, two waves with the same frequency, wavelength, and amplitude, travel in opposite directions and thereby interfere and produce a standing, or stationary, wave.

Figure 11:
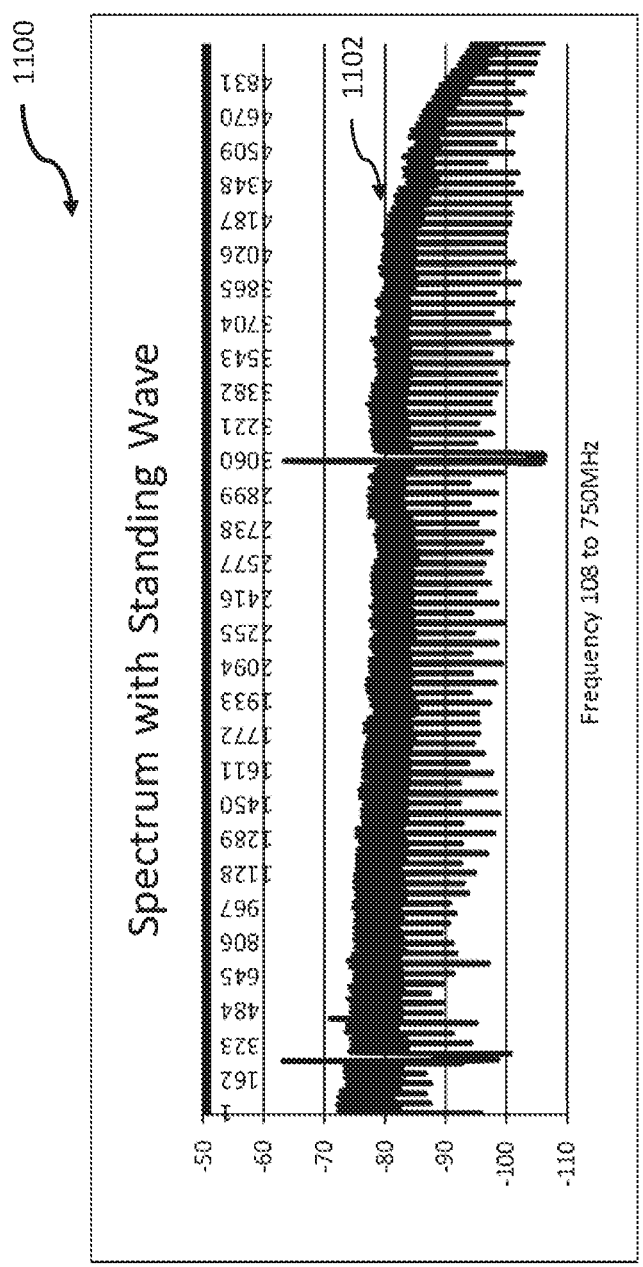
FIG. 11 is a graphical illustration of a magnitude plot of captured spectral data of the data transmission system depicted in FIG. 9.

FIG. 11 is a graphical illustration of a magnitude plot 1100 of captured spectral data of the data transmission system depicted in FIG. 9. Plot 1100 captures the spectral data 1102 from test probe 902, shown in FIG. 11 as magnitude (in dB) versus frequency (in MHz). Ripples in spectral data 1102 of plot 1100 created by the open circuit at reflection point 910.

Figure 12:
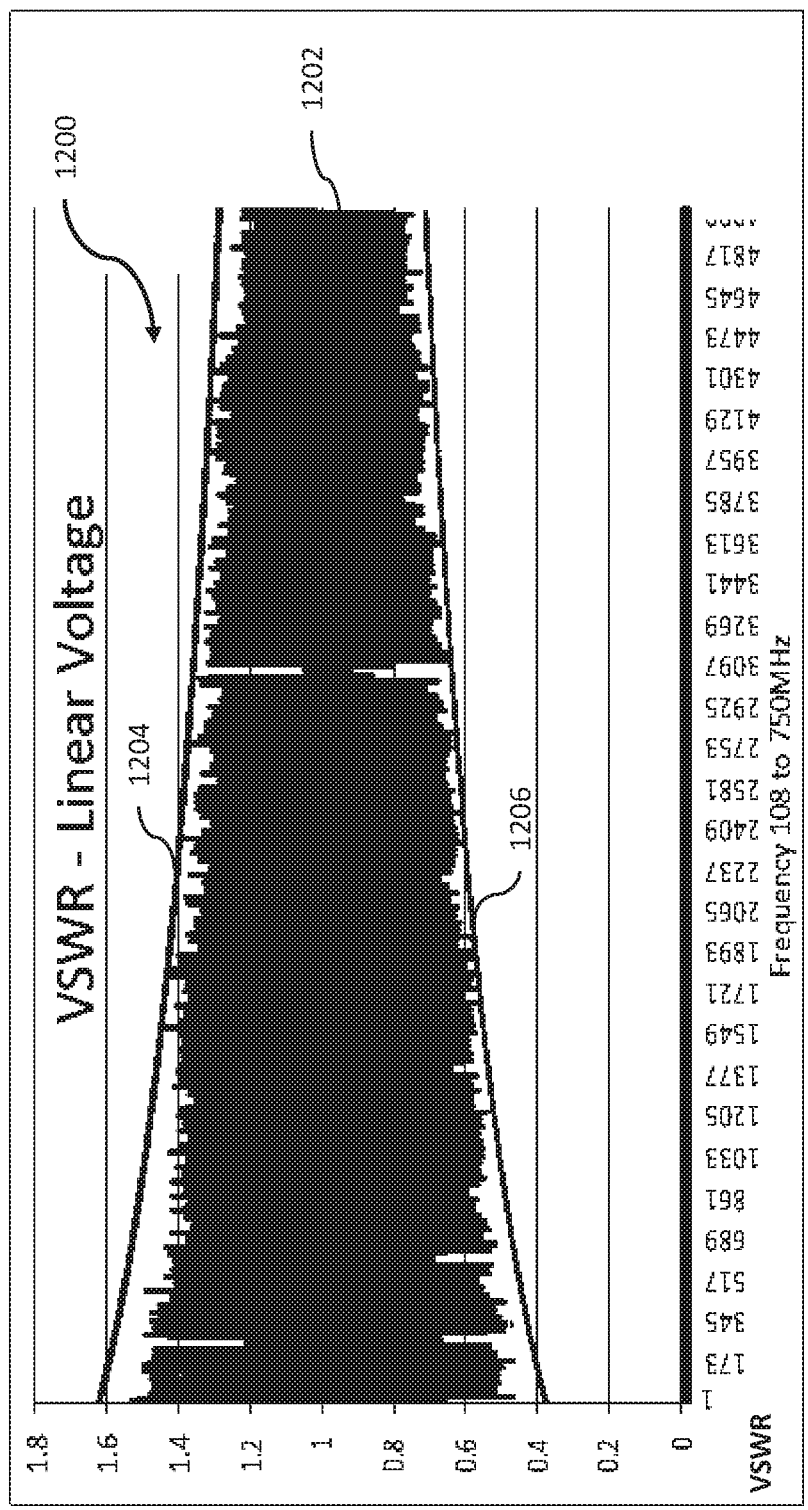
FIG. 12 is a graphical illustration of a voltage standing wave ratio plot for the data transmission system depicted in FIG. 9.

FIG. 12 is a graphical illustration of a voltage standing wave ratio (VSWR) plot 1200 for data transmission system 900, depicted in FIG. 9. VSWR plot 1200 is shown voltage amplitude (in VSWR) versus frequency (in MHz), and illustrates the effect at different frequencies of reflection signal 912 adding (in-phase) and subtracting (out-of-phase) components. In this example, $L_M$ is 30 meters of undamaged cable, but greater or lesser lengths of cable may be used, and damaged or undamaged. VSWR plot 1200 includes RF voltage data 1202, and demonstrates the ratio of a maximum 1204 to a minimum 1206 RF voltage along transmission line 904.

For VSWR plot 1200, the reciprocal of a difference frequency between two peaks of data 1202 indicates the round-trip delay of the echo/reflection, from which the distance to the short, $L_M$, is determined. Typically, cable loss characteristics of transmission line 904 are known, and therefore also the expected loss, and from such known values the expected VSWR is computed. That is, maximum 1204 represents a high limit line and minimum 1206 represents a low limit line on VSWR plot 1200. The distance between the respective limit lines 1204 and 1206 is shown to decrease with increasing frequency because the loss characteristics (attenuation) of a typical cable tend to be greater at higher frequencies. In the case where the transmission line loss is too high (i.e., a defect), the VSWR amplitude will come up short of limit lines 1204, 1206.

In an exemplary embodiment, test data for VSWR plot 1200 may be captured using software defined radio and live cable signals. In some embodiments, the test data may be captured by a full band capture chip, or a conventional spectrum analyzer. The test data may also be captured from both drop and hardline. In the case where a reflection occurs before the end of the transmission line (e.g., from damage to the line), a TDR determination may be made (see FIG. 13, below) to calculate the distance to the reflection/damage. Given the significantly wide bandwidth, the accuracy of this distance calculation is very high.

Figure 13:
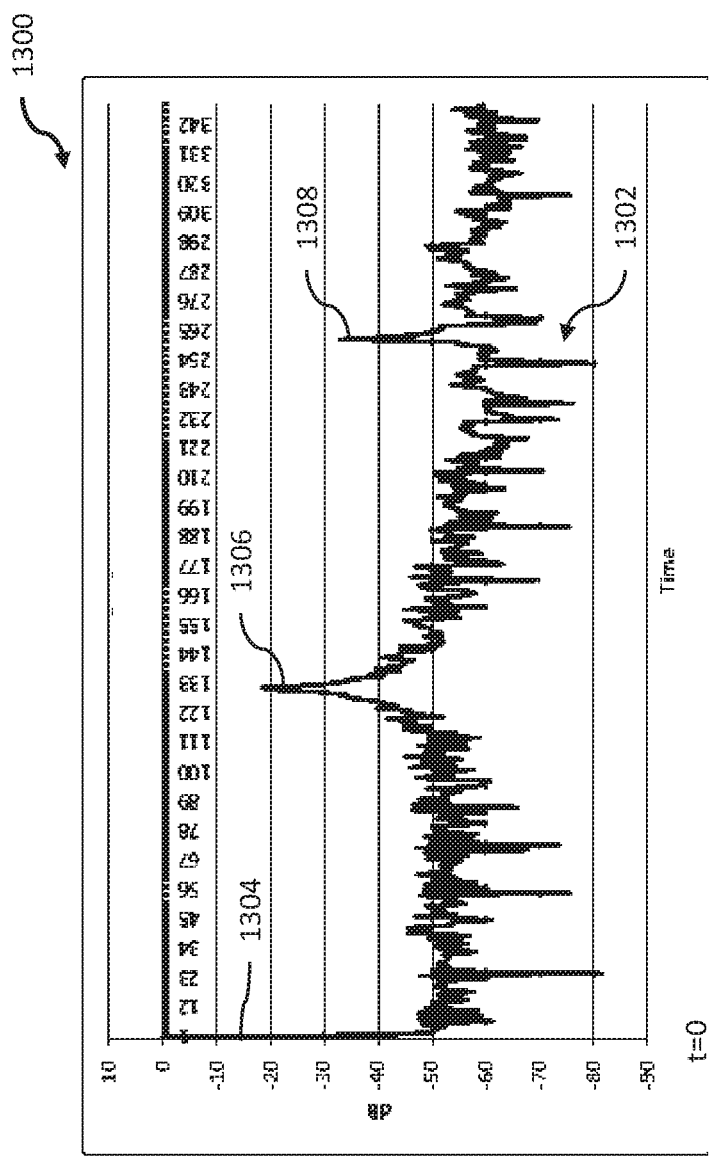
FIG. 13 is a graphical illustration of the time domain response of the plot the depicted in FIG. 12.

FIG. 13 is a graphical illustration of a time domain response 1300 of VSWR plot 1200, depicted in FIG. 12. In an exemplary embodiment, plot 1300 represents the TDR determination described above, and is obtained by taking an IFFT of the magnitude of data 1202 (FIG. 12), represented as time domain data 1302. For purposes of this determination, phase is assumed to be zero degrees, although the phase associated with the magnitude response will not generally be this value. Fast Fourier transforms generally require both magnitude and phase values, or alternatively, real and imaginary values for each discrete frequency. Conventional systems are therefore incapable of performing the IFFT of the frequency response, because they did not have the phase values. The present embodiments solve this problem by assigning arbitrary phase values, or predetermined values, whether or not the values are technically accurate. In the exemplary embodiment, the phase values are all assigned the same constant value, or zero.

At time t=0, a first peak 1304 of data 1302 indicates the outgoing signal (e.g., forward signal 908, FIG. 9), a second peak 1306 indicates capture of the reflection (e.g., reflection signal 912) from the open circuit (e.g., reflection point 910), and a third peak 1308 is created by a second round-trip reflection from the high impedance probe (e.g., test probe 902). Alternately, second order distortion a large standing wave may create peak 1308. This second order distortion is created by (falsely) assuming the phase is zero for all frequencies. In cases where a transmission line contains multiple reflections (illegal tap, defects, etc.), each such reflection will appear on the time domain response 1300 as its own peak, and a distance to such reflections may be calculated accordingly. In this example, the IFFT is described. Alternatively, the transform may be one of several known transforms, such as discrete, Hartley, etc.

According to this advantageous configuration, a single reflection may be reabsorbed by the source. Frequency response may stay relatively flat, with minor energy loss, and the transmission line may be probed by a single technician with a high impedance probe, without requiring a second technician at another end of the line, or more expensive/complex transmitters and receivers. This technique is an alternative to the testing schemes described above that utilize upstream equalization coefficient analysis to identify echo tunnels. That is, according to these embodiments, there is no need to measure a length of an echo tunnel, since no echo tunnel is formed from a single reflection.

In the echo tunnel testing schemes, detections are made at the reception site (e.g., the hub or a home), and two impedance mismatches are required to form a tunnel. The location of such tunnels are not known, and the length is approximate. The delay accuracy is inversely proportional to the width of the test bandwidth Once one end of the tunnel is repaired, however, the tunnel disappears. That is, once one of the impedance mismatches is removed, the other impedance mismatch is insufficient to form a tunnel by itself. The unrepaired defect thus becomes undetectable (through the tunnel technique) and remains unrepaired. The limited bandwidth (e.g., a 6 MHz carrier) can also limits accuracy of the distance approximations.

Figure 14:
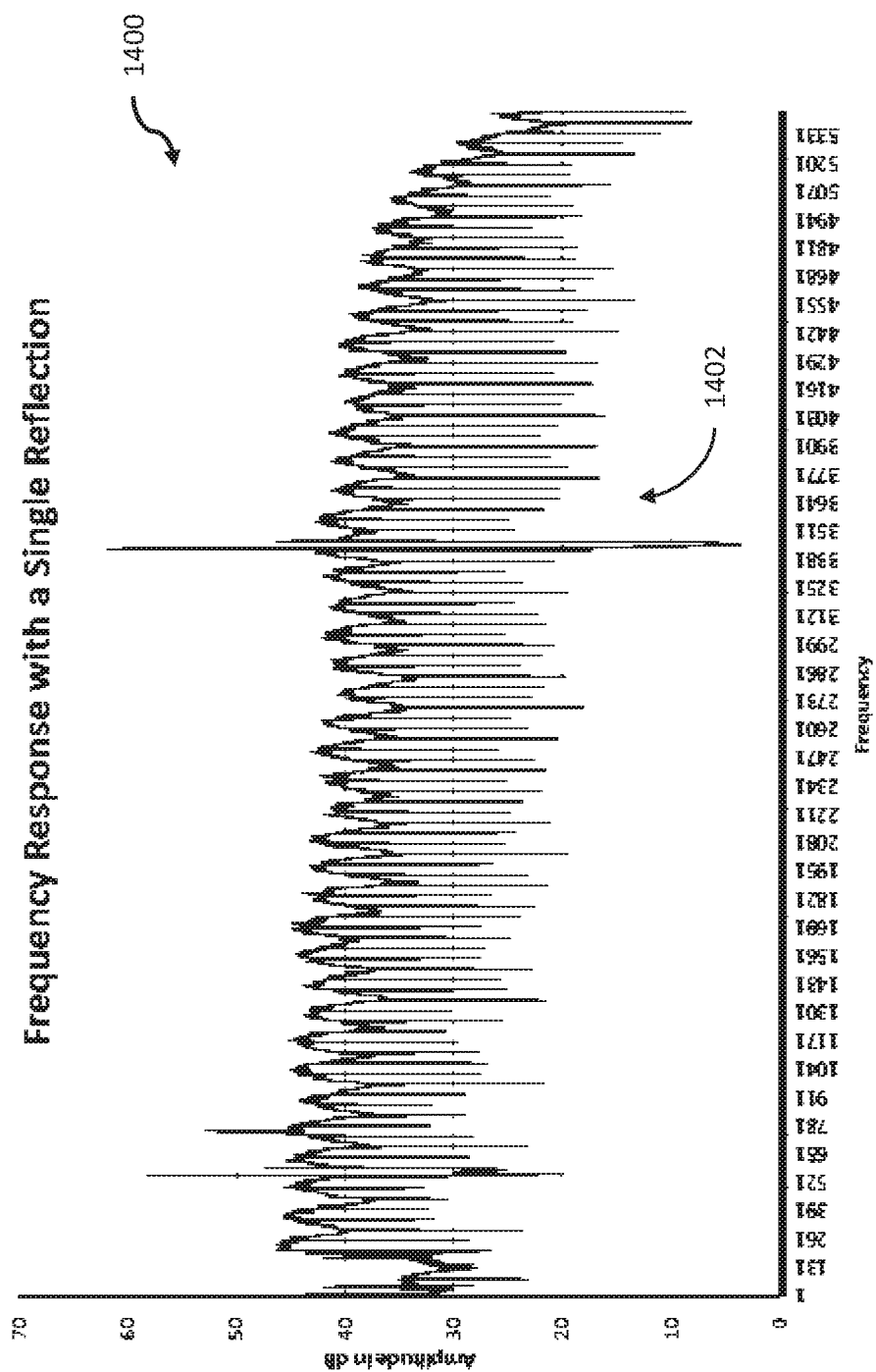
FIG. 14 is a graphical illustration of a magnitude plot of frequency response of an alternative data transmission system.

FIG. 14 is a graphical illustration of a magnitude plot 1400 of frequency response of an alternative data transmission system, illustrated as amplitude (in dB) versus frequency (in MHz). Plot 1400 is similar to magnitude plot 1100 (FIG. 11), and includes frequency domain data 1402 showing ripples, and indicating the frequency response with a single reflection, as described above as an alternative embodiment.

Figure 15:
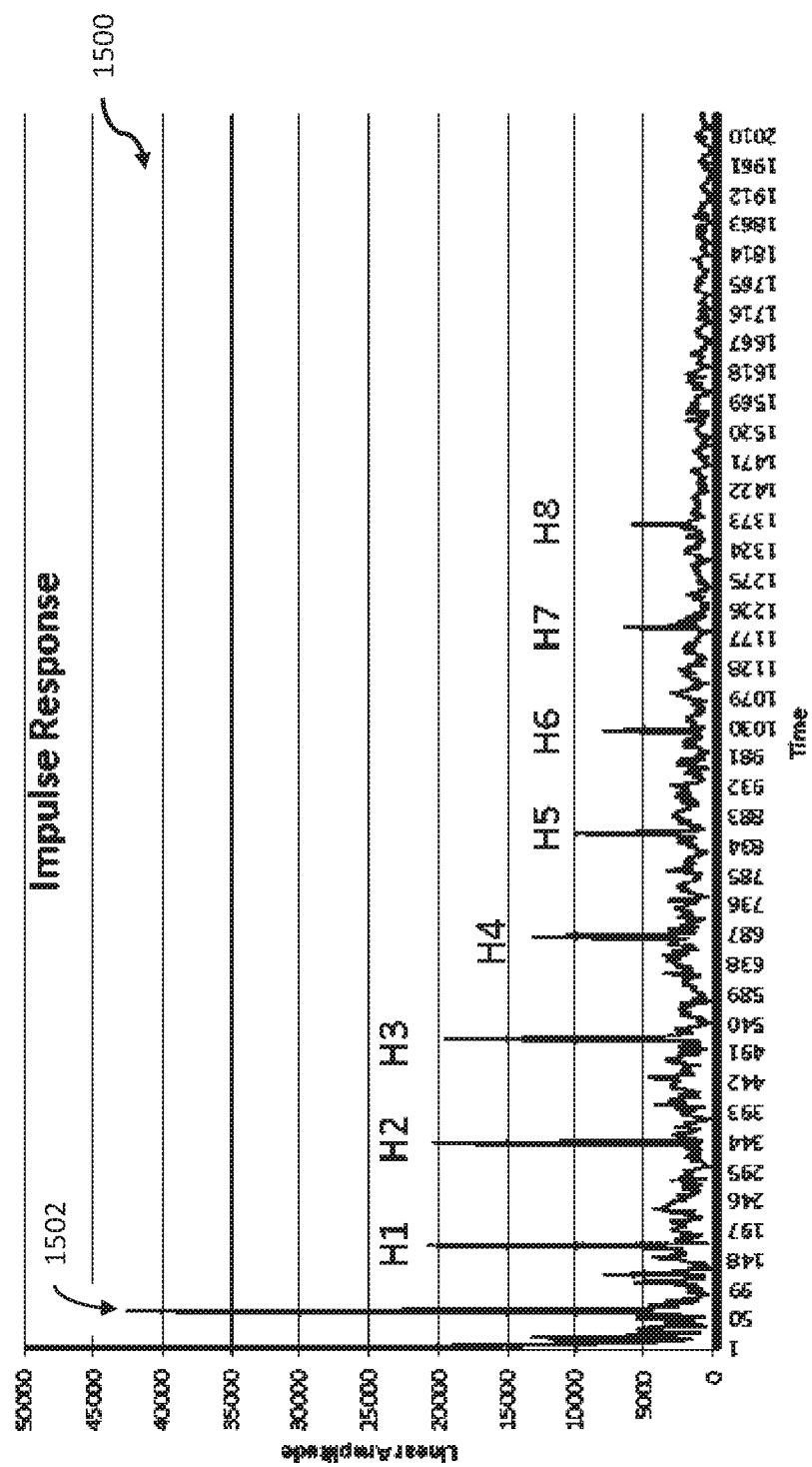
FIG. 15 is a graphical illustration of the impulse response of the plot depicted in FIG. 14.

FIG. 15 is a graphical illustration of the impulse response 1500 of plot 1400, depicted in FIG. 14. Impulse domain response 1500 is similar to time domain response 800, FIG. 8, and includes an impulse 1502 and a plurality of peaks H1-H8. In the exemplary embodiment, impulse response 1500 indicates reflection in the time domain, and is created by performing an IFFT on plot 1400, FIG. 14. Impulse 1502 is caused by the ripple effect (wave) in the captured spectral data 1402, and peaks H1-H7 are caused by spectral notches between carriers, as described above, for example, with respect to response 800.

In the exemplary embodiment, magnitude data may be obtained using full band capture chips, analog spectrum analyzers, software defined radios, or conventional technician meters that would be upgraded to include software embodying the systems and methods described herein.

According to the advantageous systems and methods herein, digital signal processing (DSP) techniques for transmission line defects may be implemented utilizing greater averaging (e.g., 1024 instead of 256). Response data may be flattened before performing the IFFT, and vacant channels, pilots, and NTSC channels may be filled or interpolated. More optimized windows may be utilized, and harmonics may be removed or canceled at chosen periods (e.g., every 167 ns). Additionally, the IFFT may be limited to frequencies where the ripple is greatest, thereby reducing the necessary time resolution, while increasing the signal to noise ratio.

In embodiments where drop or hardline testing is implemented, the testing schemes described above may be performed by disconnecting the drop at the ground block, or by short-circuiting the drop. Alternatively, the test probe can capture a cable signal on the drop at the tap, and the drop loss may be computed from the captured ripple magnitude. In some embodiments, the loss will vary with the frequency, in the reflected signal can make a round trip to the open circuit/reflection point and back again. The measured length of cable may be utilized to compute the expected loss for that cable type. By utilizing a single test probe, a technician in the field may receive an indicator of a line defect as a simple pass/fail test result (e.g., an auditory and/or visual signal or indicator on the test device), and the tested cable will only require further analysis if the test result indicates a failure. In the exemplary embodiment, only a single test probe is required. In some embodiments, the testing schemes described above may also be implemented using a return loss bridge with a transmitter/receiver and/or a network analyzer. A number of the advantages realized by the embodiments herein, as described above, will still be achieved utilizing the more cumbersome and/or complex hardware.

The additional embodiments described herein significantly improve the ease and accuracy of determining a defect occurring on an available in-service data transmission line based on the captured standing wave and ripple data from a test signal transmitted to a reflection point. That is, the live broadband in-service signal can be utilized for the forward and resultant reflection signals. For transmission lines that are not in-service (i.e., not yet operational, disconnected, etc.), a test signal may be utilized as the forward signal. In some embodiments, the test signal may be a random noise signal. The embodiments further allow for the advantageous determination and location of a single transmission line defect without requiring two impedance mismatches. Each defect may be individually detected and repaired without requiring another defect for reference.

Another preferred method to remove the harmonics H1, H2, H3, etc., is to capture the downstream signal 908 and use it as a calibration signal. This implementation can be achieved by subtracting the dB value of the calibration downstream signal at each frequency from the bidirectional signal's value before performing the IFFT. The calibration signal can be captured, for instance, at an amplifier's directional coupler test port, or from a tap's F-connector port.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of detecting line attenuation on an operational data transmission line transmitting an in-service digital signal, the method comprising the steps of:
   electrically contacting a center conductor of the operational data transmission line at a first location on the operational data transmission line;
   transmitting a broadband data signal from the center conductor in a first direction along the operational data transmission line, wherein the broadband data signal is different from the in-service digital signal;

measuring, at the first location, a return signal from a reflection point at a second location on the operational data transmission line different from the first location, the return signal being a reflection of the transmitted broadband data signal traveling in a second direction opposite the first direction;

collecting, at the first location, while the operational data transmission line is transmitting the in-service digital signal, spectral data of the broadband data signal, the return signal, and a standing wave created by the sum of the broadband data signal and the return signal;

determining the voltage standing wave ratio (VSWR) of the standing wave; and calculating a line attenuation from the determined VSWR.

2. The method of claim 1, wherein the step of collecting utilizes one of a software-defined radio and a spectrum analyzer.

3. The method of claim 1, wherein collected spectral data exhibits a ripple effect.

4. The method of claim 3, further comprising the step of assigning a constant value for phase of the collected spectral data.

5. The method of claim 4, further comprising the step of performing an inverse Fourier transform on the collected spectral data.

6. The method of claim 1, further comprising the step of, prior to the step of measuring, inducing an impedance mismatch at the second location, the induced impedance mismatch including at least one of an electrical short, an open circuit, and an electrical disconnection.

* * * * *